United States Patent
Karsten et al.

(10) Patent No.: US 7,426,183 B2
(45) Date of Patent: Sep. 16, 2008

(54) METHOD FOR DETERMINING LOAD IN A COMMUNICATIONS NETWORK BY MEANS OF DATA PACKET MARKING

(75) Inventors: Martin Karsten, Waterloo (CA); Jens Schmitt, Lampertheim (DE)

(73) Assignee: Technische Universitaet Darmstadt, Darmstadt (DE)

( * ) Notice: Subject to any disclaimer, the term of this patent is extended or adjusted under 35 U.S.C. 154(b) by 802 days.

(21) Appl. No.: 10/503,176

(22) PCT Filed: Jan. 24, 2003

(86) PCT No.: PCT/DE03/00189

§ 371 (c)(1), (2), (4) Date: Jul. 30, 2004

(87) PCT Pub. No.: WO03/065644

PCT Pub. Date: Aug. 7, 2003

(65) Prior Publication Data

US 2005/0083951 A1    Apr. 21, 2005

(30) Foreign Application Priority Data

| Feb. 1, 2002 | (DE) | ................................ 102 04 088 |
| Jul. 11, 2002 | (DE) | ................................ 102 31 247 |
| Aug. 7, 2002 | (DE) | ................................ 102 36 108 |

(51) Int. Cl.
*H04L 12/28* (2006.01)

(52) U.S. Cl. ....................................... 370/235; 370/252

(58) Field of Classification Search .................. None
See application file for complete search history.

(56) References Cited

U.S. PATENT DOCUMENTS 6,459,682 B1 * 10/2002 Ellesson et al. ............. 370/235

(Continued)

OTHER PUBLICATIONS

Kudangode K. Ramakrishnan, et al., IETF RFT 3168: The Addition of Explicit Congestion Notification (ECN) to IP, Sep. 2001.

(Continued)

*Primary Examiner*—Firmin Backer
*Assistant Examiner*—Roberta A. Shand
(74) *Attorney, Agent, or Firm*—Milde & Hoffberg, LLP

(57) ABSTRACT

The invention relates to a method for determining the load in a communication network provided with network elements such as internal nodes and links and with access nodes, respectively comprising an input node and an output node, which derive and transfer data packets from connected terminals and/or other networks. The internal nodes and links from paths according to routing algorithms and the internal nodes provide data packets with a load-dependent marking. According to the invention, the output nodes separately count up the data packets arriving from the communication network and the markings contained therein according to paths, deriving therefrom a value for the relative load along the respective path, and the values derived from all output nodes are introduced as parameters into system of equations describing the communication network with the internal nodes access nodes, whereby the solution thereof results in a determined relative network element load. The respectively determined relative load can be corrected according to other determined incoming data throughout rates and overall data throughout rates of the network elements. Different marking algorithms can also be used by the internal nodes according to information contained in the header of the data packets.

13 Claims, 1 Drawing Sheet

U.S. PATENT DOCUMENTS

| | | | |
|---|---|---|---|
| 6,483,805 B1 * | 11/2002 | Davies et al. | 370/235 |
| 6,914,883 B2 * | 7/2005 | Dharanikota | 370/230.1 |
| 7,136,351 B2 * | 11/2006 | Metin et al. | 370/230 |
| 2002/0107908 A1 * | 8/2002 | Dharanikota | 709/203 |
| 2003/0048797 A1 * | 3/2003 | Sandstrom | 370/402 |

OTHER PUBLICATIONS

R. Braden et al., IETF RFT 2205: Resource ReSerVation Protocol (RSVP), Sep. 1997.

* cited by examiner

METHOD FOR DETERMINING LOAD IN A COMMUNICATIONS NETWORK BY MEANS OF DATA PACKET MARKING

TECHNICAL FIELD

The invention relates to a method for determining the load in a telecommunications network with network elements such as internal nodes and links, and with access nodes, whereby each of the access nodes consists of an ingress node and an egress node, and pass data to or from terminal devices and/or other networks whereby the internal nodes and links form paths according to routing algorithms by means of which the data packets are routed from an ingress node to an egress node, and whereby the internal nodes provide data packets with load-dependent marking.

STATE OF THE ART

In order to identify overloads or congestion in the internet, it was revealed by Kudangode K. Ramakrishnan, Sally Floyd, and David Black, IETF RFT 3168: *The Addition of Explicit Congestion Notification (ECN) to IP*, September 2001 that a mark consisting of a correspondingly-set bit is added to those data packets that have passed through at least one internal node and that have had an overload identified. Upon reception of the data packet at an egress node, it may be determined whether at least one of the nodes and links used to transfer these data packets is highly loaded or overloaded. The above-mentioned document and those of the IETF (Internet Engineering Task Force) mentioned below may be found on the Internet at the address http://www.ietf.org/rfc.html.

In the known procedures for load-dependent marking, the term load refers to the transmission load at the output link rather than the computational load of the forwarding node. This includes the implicit assumption that the forwarding capacity of the forwarding node is always adequate, and the high load becomes an overload if the sum of the traffic exceeds this capacity of a specific link.

The known procedures for load-dependent marking may be subdivided into:
Queue oriented (marking occurs when the queue exceeds specified fill levels),
Rate-oriented (marking occurs dependent on the traffic rate), and
Virtual queue (here, a virtual system is simulated in which the transfer capacity is less than in the real system; when the queue in the virtual system exceed specified fill levels, marking occurs in the real system).

Using these known procedures, an approximate determination of the load of any path is possible. Determination of the load within the communications network, particularly within individual network elements, is however not possible.

SUMMARY OF THE INVENTION

It is therefore the object of the invention to provide a method for determining the load within a communications network by means of which the load of individual network elements may be determined.

This object is achieved in a first embodiment of the invention wherein the egress nodes count the data packets and the included marks entering the communications network, and produce a result for each for the relative load along that particular path, and wherein all values derived from all egress nodes are entered as parameters in a system of equations that describes the communications network with internal nodes and access nodes, and whose solution produces the determined relative load of network elements.

This procedure has the advantage that the load for network elements may be determined that were identified when the marks were emplaced. Such network elements are primarily nodes and links, whereby the procedure is not limited to these network elements, but instead other network elements such as buffers into which the procedure may be introduced. No additional equipment is required in the nodes in order send load messages to one or several central or non-central points. Internal nodes may essentially remain in the same structure as in the current Internet, for example.

A further development of the method according to the invention consists of the fact that the system of equations is linear. This development may be advantageously so configured that the system of equations is as follows:

$$\Sigma \ln(1-m(L_n)) = \ln(1-m(P_{i,j}))$$

for all i and j, whereby $L_n$ is the relevant load of an network element, m(L) is a function for calculation of mark probability between 0 and 1 for a relative load L and $M(P_{i,j})$ is the derived relative load of a path p between an ingress node i and an egress node j, and whereby the sum of all network elements of the specific path $P_{i,j}$ is formed.

This development allows for the equations to be calculated with the least possible computer time, so that determination of the load during these largely brief intervals occurs without extensive computer time. These calculations may occur within a central location. Conduction of the procedure based on the invention is also possible at many suitable non-central locations such as the access nodes.

A pre-requisite for reliable load determination is provided in one exemplary embodiment wherein the nodes reflect the frequency of marks according to a continuous and strictly monotonic increasing function of the load.

In order to determine the load in a particular network element, namely internal nodes and links, the procedure based on the invention may include the fact that, during marking in the nodes, the load is determined at the node and/or that, upon marking, the loads in the link preceding the node are taken into account.

Another embodiment of the method according to the invention uses the determined relative load to control routing algorithms, and the determined relative loads in path assignments of the data packets to be sent to the ingress node are taken into account.

Also the determined relative loads may be stored for use in subsequent evaluations.

Normally, the number of paths exceeds that of the links or nodes. Since the individual parameters of the calculations also include a certain degree of error (from the delay during data acquisition), it may occur that the equation system is over-specified and thus not directly soluble. This is prevented in another exemplary embodiment by the fact that the calculations for solution of the equation system follow when the number of values for the relative load reported from the egress nodes are adequate to provide an unambiguous solution to the equation system.

This means that only the newest of the path-load values containing the quantity of network elements are used for calculations that are linearly independent, thus covering all network elements.

In addition to the determination of the relative load within the communications network, particularly the relative load of all network elements, the method according to the invention may also be used to determine the capacities of all network elements. For this, a further exemplary embodiment of the invention provides that in the egress nodes the ingoing data rate is further determined based on separate paths, and that the following equation be used to determine the capacities of all network elements:

$$C_n = (\Sigma t_{i,j})/L_n,$$

whereby $C_n$ is the capacity of the network element, $L_n$ is the determined relative load, $t_{i,j}$ is the transferred data rate along a path $P_{i,j}$, and the sum over all paths $P_{i,j}$ is formed.

In the method according to the invention, the relative load of individual network elements may be determined, or, more properly expressed, may be estimated, but errors arise because of unavoidable measurement accuracies and transfer delays. In the above-mentioned expansion of the procedure based on the invention, the equation system consists of a multiplicative linking of coefficients. This linking is converted to an additive linking via a logarithmic-function transformation so that a linear equation system results. Due to the original multiplicative linking of coefficients the above-mentioned errors may become quite large.

This is prevented by another development of the embodiment, wherein:

The incoming data rate in the egress nodes is determined separately by path,

The determined data rates for the individual network elements determined for those paths along which the particular network element lies are added to the total data rate of the network element, The total data rate and the relative load may be determined again, and The determined relative load is corrected taking into account the previously-determined relative load and an alteration of the total data rate.

The data rates of all paths passing through the node or link are added to determine the total data rate per node or per link. This addition has the advantage that errors are not repeated and enlarged as in the above-mentioned equation system.

An advantageous embodiment of this development is based on the fact that the corrected relative load is calculated from the median of each determined load and the previously-determined relative load that is weighted with the alteration of the total data rate.

This embodiment may be so designed that the calculation of the corrected relative load is based on the equation $$Lk = (\alpha \cdot La \cdot Un/Ua + Ln)/(\alpha+1),$$

where $Lk$ is the corrected relative load, $\alpha$ is a weighting factor that determines how strong the alteration of the total data rate is taken into account, $La$ is the previously determined value for the relative data rate, $Un$ is the particular determined total data rate, $Ua$ is the previously determined total data rate, and $Ln$ is the actually-determined relative load.

The weighting factor $\alpha$ is to be determined individually by the specialist based on pre-conditions.

The known procedures assume that different marking algorithms are not used within the same communications network.

It may be useful for various reasons, however, to apply different marking algorithms approximately simultaneously, and to take them into account separately during evaluation. In the known procedures, however, no retracing to the particular marking algorithm used to mark the data packet is possible.

A second embodiment of the invention allows the internal nodes to use at least two different marking algorithms depending on which type is specified in the header of each data packet to be forwarded, that the ingress nodes corresponding to the number of different marking algorithms per path of the different marking algorithms indicate a predetermined portion of the types, and that in order to determine marking rates of the marking algorithms used, the egress nodes apportion the number of marked data packets corresponding to the ratio of the number of individual types of unmarked data packets.

According to standards in current use in the Internet, two bits are provided within the header that switch to a predetermined state (11) in marked data packets (CE marking). For unmarked data packets, two code points are possible—ECT01 and ECT10. Data packets that possess the code 00 are not marked, but rather are discarded with a high degree of probability.

For application within the scope of these standards, a development of the invention includes the fact that two different marking algorithms are used dependent on the two possible types specified in the header, and preferably that the ingress nodes designate data packets sent along a particular path with one or the other type equally frequently.

A simple determination of the marking rate related to each marking algorithms is possible using an advantageous embodiment of the invention in that the relative marking rate is calculated in the egress nodes for the first type by $M1 = 1 - (2a/N)$, and for the second type by $M2 = 1 - (2b/N)$, whereby N is the sum of all received marked data packets or of all the data packets marked with one of the types, a is the number of unmarked received data packets of the first type, and b is the number of the received unmarked data packets of the second type.

For a full understanding of the present invention, reference should now be made to the following detailed description of the preferred embodiments of the invention as illustrated in the accompanying drawings.

DESCRIPTION OF THE PREFERRED EMBODIMENTS

Figures 1, 2:
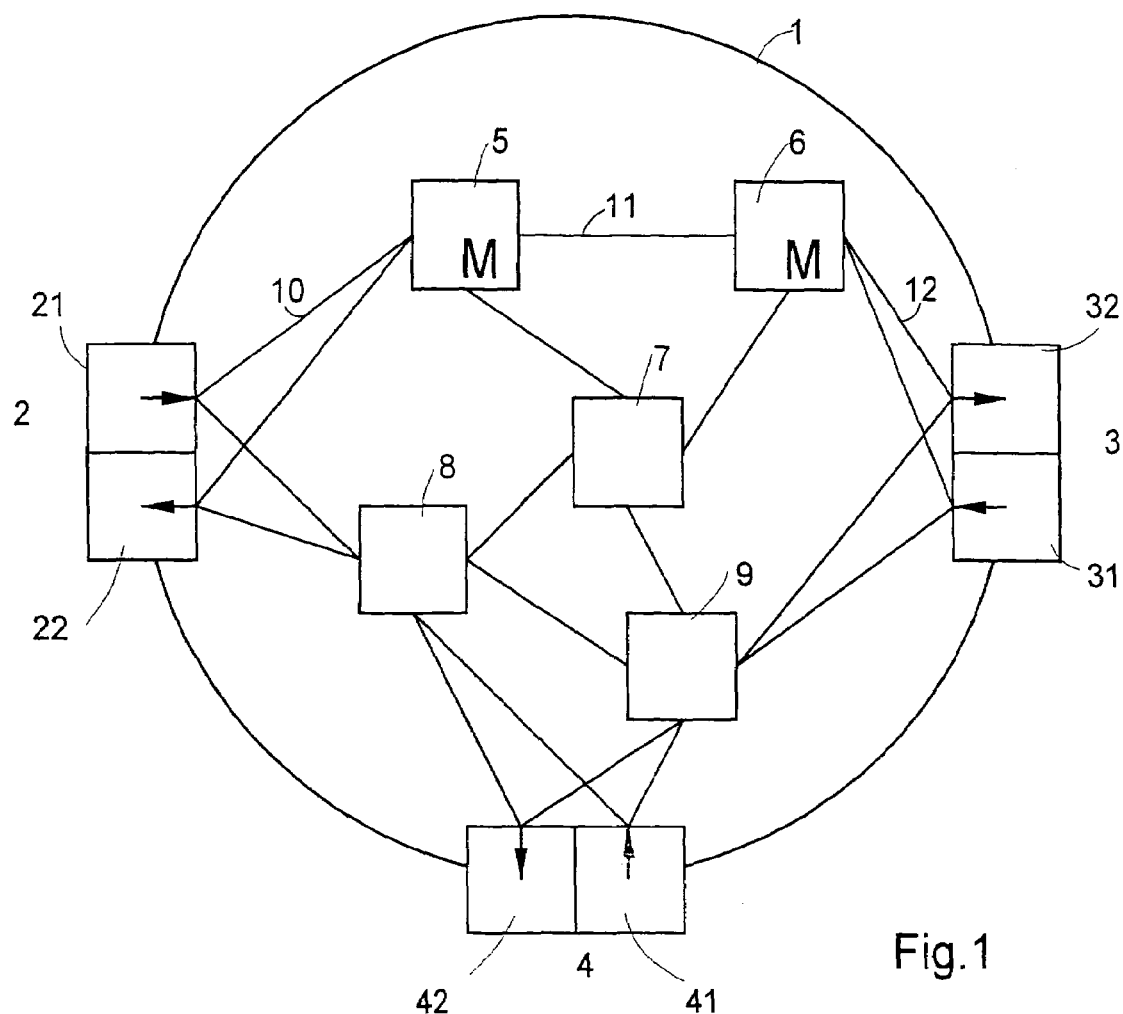
FIG. 1 depicts a communications network schematically.
FIG. 2 illustrates an example for marking of data packets upon implementation of the second embodiment example of the procedure based on the invention.

FIG. 1 shows schematically the communications network 1 with access nodes 2, 3, 4 (gateways) and internal nodes 5, 6, 7, 8, 9. The access nodes 2, 3, 4 connect the communications network 1 with other networks and terminal devices, each consisting of one ingress node 21, 31, 41 (ingress node) and an egress node 22, 32, 42 (egress node). The internal nodes 5 through 9 serve to forward the data packets from an ingress node 21, 31, 41 to an egress node 22, 32, 42. Which path is taken by a particular data packet is determined by the routing algorithms and adjusted based on the loads of individual nodes. The routing algorithms in particular are known, need not be described in any greater detail in connection with this invention.

If, for example, an increased traffic demand arises for the internal nodes 5, 6 then the data packets forwarded them are provided with a mark M. Such marks contain, for example, the data packets that are forwarded from ingress node 21 via internal nodes 5, 6 to the egress node 32. If the internal nodes, as well as their connections with one another and with nodes 21 and 32 overloaded, then the data packets to be sent from the ingress node 21 to egress node 32 are routed through the internal nodes 8, 9.

At the egress node 32, the data packets received from ingress node 21 that are marked M are counted for a pre-determined time interval. Also, the bytes and the data packets are counted that are transferred from ingress node 21 to egress node 32 during the pre-determined time interval. The number of marks divided by the number of data packets gives a good measure for the load on the communications network with respect to the transfer between the ingress node 21 and the egress node 32.

In the individual internal nodes, marking is performed with a probability m(L), where L is a relative load. For each pair (i,j) of access nodes connected by a path, $p_{i,j}$ is the connecting path. Thus, the measured load $M(p_{i,j})$ along the path $p_{i,j}$ amounts to $$M(p_{i,j})=1-(1-m(L_1))\cdot(1-m(L_2))\cdot\ldots\cdot(1-m(L_n)),$$

where n is the number of nodes for each path, and an equation is created for every path $p_{i,j}$. This equation system may be transformed as follows:

$$1-M(p_{i,j})=(1-m(L_1))\cdot(1-m(L_2))\cdot\ldots\cdot(1-m(L_n)).$$

By means of logarithmic application, one obtains the linear equation system $$\Sigma\ln(1-m(L_n))=\ln(1-M(p_{i,j}))$$

for any value of i and j for which the function $\ln(1-m(L_1))$ may be substituted by $y_i$. In case $m(L_1)$ possesses an inverse function of between 0 and 1, then $\ln(1-m(L_1))=y_i$ may be solved for all nodes. Using the solution of the linear equation system, the solution of the egress equation system may be determined.

In case the calculation of m(L) is based on link load, then the paths must be viewed as directed, i.e., both directions of a path are considered separately. Correspondingly, both directions of a link are represented by separate load conditions.

The capacity $c_n$ of the nodes or links may be calculated based on the determined values for the relative load $L_n$ of the internal nodes or links and the data rates determined from the egress nodes or transferred via the individual data paths $p_{i,j}$ as follows:

$$C_n=(\Sigma t_{i,j})/L_n,$$

Where $C_n$ is the capacity of the network element, $L_n$ is the determined relative load, $t_{i,j}$ is transferred data rate along a path $p_{i,j}$, and the sum is formed using all paths $p_{i,j}$.

In another embodiment example, the relative load L for the individual network elements (internal nodes and links) is determined by solution of the equation system $$\Sigma\ln(1-m(L_n))=\ln(1-M(p_{i,j}))$$

Further, the total data rate for individual network elements are determined from the separate data rates at the egress nodes 22, 32, 42 to the individual paths. This is achieved by addition of the data rates of those paths on which the particular network element is located. Thus all paths are taken into account that are possible based on the network structure and the routing algorithm.

As an example, the following equation may be stated for the internal nodes 8:

$$U(8)=U(21,8,7,6,32)+U(21,8,7,9,32)+U(31,6,7,8,22)+U(31,9,7,8,22)+U(21,8,42)+U(21,8,7,9,42)+U(41,8,22)+U(41,9,7,8,22)$$

U(21, 8, 7, 6, 32) represent the data rate of the path between the ingress node 21 via the internal nodes 8, 7, and 6 to the egress node 32.

Both the relative load L and the total data rate are measured at regular intervals—e.g., at intervals of a few seconds. In the preferred embodiment, the newly-determined values Ln and Un and the approximated values La and Ua for each network element are used to form the corrected load Lk based on the following equation:

$$Lk=(\alpha\cdot La\cdot Un/Ua+Ln)/(\alpha+1).$$

The weighting factor may be determined by the specialist from the following points of view:

If $\alpha$ is less than 1, the effect of the correction based on the invention is very small. However, a rapid adaptation to alterations of the available capacity at which the relative load alters quickly, but the total data rate does not. The larger $\alpha$ is, the stronger is the file updating of the previously-determined relative load based on the alteration of the total data rate. Adaptation to capacity alterations then takes longer. In the extreme case in which a is much greater than 1, then file updating occurs based on alterations to the total data rate.

In order to explain the second embodiment example, ECT marks of data packets will be observed along the links 10, 11, and 12 in the following. The ingress node 21 sends alternatively ECT types 10 and 01, as shown in the upper line of FIG. 2. It is not necessary that the exchange occurs after each data packet that is sent via link 10 to the internal node 5. The decisive factor is that the ECT types 10 and 01 are sent with equal frequency over the period under observation.

In node 5, depending on the load present, some of the data packets are provided with CE marks, i.e., both bits are set to 1. This may be seen in the second line of FIG. 2, which represents the data packet on link 11. Some data packets not yet marked are then provided with a CE mark at the internal node 6 with corresponding load, so that the data packets on link 12 shown in the lower line of FIG. 2 result. The total number N is equal to 16. Three of the data packets of type 10 are not marked, which is why a is equal to three. Five of the data packets of type 01 are not marked, which is why b is equal to five. As FIG. 2 further shows, marks may be calculated as M1=5/8 and M2=3/8.

The equations to calculate the marking rates may be derived as follows, where P is a quantity of data packets for which the relative quantity of marked data packets (i.e., the marking rate) is to be calculated. Further, N is the number of ECT01- ECT10- and CD-data packets. The other data packets (P-N) are irrelevant.

Further,

A is the quantity of ECT-01 data packets,
B is the quantity of ECT-10 data packets, and
C is the quantity of CE data packets.
Thus, N=a+b+c.

Because of alternating designation of ECT01 and ECT10 at ?? ingress nodes, then $a\leq N/2$ and $b\leq N/2$.

This results in the following marking rates:

$$M1=1-(a/(N/2))=1-(2a/N) \text{ and}$$

$$M2=1-(b/(N/2))=1-(2b/N).$$

There has thus been shown and described a novel method for determining the load in a telecommunications network which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. In a method for determining the load in a telecommunications network with network elements such as internal nodes and links, and with access nodes, whereby each of the access nodes consists of an ingress node and an egress node, and pass data to or from terminal devices and/or other networks whereby the internal nodes and links form paths according to routing algorithms by means of which the data packets are routed from an ingress node to an egress node, and whereby the internal nodes provide data packets with load-dependent marking, the improvement wherein the egress nodes count the data packets from the communications network and the marks contained therein by separate paths, and derive a value for the relative load along a particular path, and wherein the values derived from all egress nodes are entered as parameters into a linear equation system that describes the communications network, and its solution produces the determined relative load of the network elements, said equation system being as follows:

$$\Sigma \ln(1-m(L_n)) = \ln(1-m(P_{i,j}))$$

for all i and j, whereby $L_n$ is the relevant load of an network element, m(L) is a function for calculation of mark probability between 0 and 1 for a relative load L, and $M(P_{i,j})$ is the derived relative load of a path p between an ingress node i and an egress node j, and whereby the sum of all network elements of the specific path $P_{i,j}$ is formed.

2. The method as in claim 1, wherein the nodes establish the frequency of marking based on a constant and strongly rising function of the load.

3. The method as in claim 2, wherein the load in the node is based on the implementation of the marks in the nodes.

4. The method as in claim 2, wherein the load in the links radiating from the node is taken into account based on the implementation of the marks in the nodes.

5. The method as in claim 1, wherein the determined relative load is used to control routing algorithms.

6. The method as in claim 1, wherein the determined relative load is taken into account in path assignments for data packets to be sent from the ingress nodes.

7. The method as in claim 1, wherein the determined relative loads are stored in a buffer for subsequent use.

8. The method as in claim 1, wherein the calculations to solve the equation system result when the number of values for the relative load reported from the egress nodes are sufficient to provide an unambiguous solution to the equation system.

9. In a method for determining the load in a telecommunications network with network elements such as internal nodes and links, and with access nodes, whereby each of the access nodes consists of an ingress node and an egress node, and pass data to or from terminal devices and/or other networks whereby the internal nodes and links form paths according to routing algorithms by means of which the data packets are routed from an ingress node to an egress node, and whereby the internal nodes provide data packets with load-dependent marking, the improvement wherein the egress nodes count the data packets from the communications network and the marks contained therein by separate paths, and derive a value for the relative load along a particular path, wherein the values derived from all egress nodes are entered as parameters into a equation system that describes the communications network, and its solution produces the determined relative load of the network elements, and wherein an embodiment of the invention provides that the ingoing data rate be further determined based on separate paths, and that the following equation be used to determine the capacities of all network elements:

$$C_n = (\Sigma t_{i,j})/L_n,$$

whereby $C_n$ is the capacity of the network element, $L_n$ is the determined relative load, $t_{i,j}$ is the transferred data rate along a path $P_{i,j}$, and the sum over all paths $P_{i,j}$ is formed.

10. The method as in claim 9, wherein:
The incoming data rate in the egress nodes is determined separately by path,
The determined data rates for the individual network elements determined for those paths along which the particular network element lies are added to the total data rate of the network element,
The total data rate and the relative load may be determined again, and
The determined relative load is corrected taking into account the previously-determined relative load and an alteration of the total data rate.

11. The method as in claim 10, wherein the corrected relative load is calculated from the median of each determined load and the previously-determined relative load that is weighted with the alteration of the total data rate.

12. The method as in claim 11, wherein the calculation of the corrected relative load results from the equation Lk= ($\alpha \cdot$La Un/Ua+Ln)/($\alpha$+1), where Lk is the corrected relative load, $\alpha$ is a weighting factor that determines how strong the alteration of the total data rate is taken into account, La is the previously determined value for the relative data rate, Un is the particular determined total data rate, Ua is the previously determined total data rate, and Ln is the actually-determined relative load.

13. In a method for determining the load in a telecommunications network with network elements such as internal nodes and links, and with access nodes, whereby each of the access nodes consists of an ingress node and an egress node, and pass data to or from terminal devices and/or other networks whereby the internal nodes and links form paths according to routing algorithms by means of which the data packets are routed from an ingress node to an egress node, and whereby the internal nodes provide data packets with load-dependent marking, the improvement wherein the egress nodes apply at least two different marking algorithms depending on which type is specified in the header of each data packet to be forwarded, that the ingress nodes corresponding to the number of different marking algorithms per path of the different marking algorithms indicate a predetermined portion of the types, wherein in order to determine marking rates of the marking algorithms used, the egress nodes apportion the number of marked data packets corresponding to the ratio of the number of individual types of unmarked data packets; wherein two different marking algorithms are used dependent on the two possible types specified in the header; wherein the ingress nodes designate data packets sent along a particular path with one or the other type equally frequently; and wherein the relative marking rate is calculated in the egress nodes for the first type by M1=1−(2a/N), and for the second type by M2=1−(2b/N), whereby N is the sum of all received marked data packets or of all the data packets marked with one of the types, a is the number of unmarked received data packets of the first type, and b is the number of the received unmarked data packets of the second type.

* * * * *